(12) United States Patent
Brébisson

(10) Patent No.: US 7,403,189 B2
(45) Date of Patent: Jul. 22, 2008

(54) GRAPHICAL CALCULATOR

(75) Inventor: Cyrille de Brébisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 504 days.

(21) Appl. No.: 10/636,780

(22) Filed: Aug. 8, 2003

(65) Prior Publication Data

US 2005/0030290 A1 Feb. 10, 2005

(51) Int. Cl.
*G09G 5/00* (2006.01)

(52) U.S. Cl. .......................... 345/169; 345/172

(58) Field of Classification Search ......... 345/156–172, 345/179, 440; 341/20; 434/323; 235/58, 235/60, 145, 56; 702/179; 708/174, 131
See application file for complete search history.

(56) References Cited

U.S. PATENT DOCUMENTS

| | | | | |
|---|---|---|---|---|
| 5,050,312 A | * | 9/1991 | McCannon | 33/700 |
| 5,146,231 A | * | 9/1992 | Ghaem et al. | 342/419 |
| 5,245,559 A | * | 9/1993 | Lapeyre | 708/174 |
| 5,530,619 A | * | 6/1996 | Koenck et al. | 361/680 |
| 5,539,194 A | * | 7/1996 | Miller et al. | 235/472.02 |
| 5,586,060 A | * | 12/1996 | Kuno et al. | 702/179 |
| 5,739,744 A | * | 4/1998 | Roca et al. | 341/20 |
| 5,825,001 A | * | 10/1998 | Oba et al. | 235/85 R |
| 5,870,319 A | | 2/1999 | Thornton et al. | |
| 2003/0103002 A1 | * | 6/2003 | Hasebe et al. | 342/357.08 |
| 2003/0122776 A1 | | 7/2003 | Fortenberry et al. | |
| 2004/0073325 A1 | * | 4/2004 | Reeves | 700/91 |
| 2004/0218104 A1 | * | 11/2004 | Smith et al. | 348/734 |
| 2004/0227738 A1 | * | 11/2004 | Sudoh | 345/173 |
| 2005/0075908 A1 | * | 4/2005 | Stevens | 705/2 |

FOREIGN PATENT DOCUMENTS

WO WO02080377 10/2002

OTHER PUBLICATIONS

XP002409901; URL: http://education.it.com/guidebooks/graphing/8992p/8992bookeng.pdf[retrieved on Nov. 28, 2006] Chapter 2: operating the calculator TI-89.
European Communication for Application No. 04 254 474.2-1243 dated Feb. 12, 2008.

* cited by examiner

*Primary Examiner*—Nitin Patel

(57) ABSTRACT

A hand-held graphical calculator having a display and an input area is described. The input area includes a maximum of 30 keys and an input device. A hand-held graphical calculator package includes a hand-held graphical calculator for graphically displaying a user-entered expression and a user manual is described. The user manual is a single sheet of instructions describing operation of the graphical calculator.

17 Claims, 4 Drawing Sheets

The Menu

Press the Menu Key , a menu apears.
The UP and DOWN keys change the selection to the previous or next item.
 Validates the selected item.
 cancels the menu.
The menu gives you access to new functions like the Linear System Solver.

Drawing a graph

To draw the graph of a function, enter an expression depending upon the X variable (Enter X using the  Keys) then Validate with the  key.
Example: SINX(X)

Drawing a polar graph

To draw a polar graph, enter an expression depending upon the θ variable (Enter θ using the  Key).
Example: SIN(5*θ)*3

Using the Keyboard

On Prometheus, each key has two different functions:
Pressing a key will activate it's primary function (shown in white).
Pressing a key immediately after pressing the Shift Key  will activate the secondary function (shown in blue).
Example: Pressing the  key then the  key enters a square root symbol.

Turning On and Off the Calculator

To turn on the calculator, press the  Key.
To turn off the calculator, press the  Keys.
While the Calculator is on the  Key act as a cancel.

The Normal environment

The normal environment is the place where you enter computations. It also shows you your last 4 computations.
In the normal environment,
- Pressing a numeric or function key adds the number or function in the current command line. Note: You can also enter a function through the menu.
- Pressing the right/left key will move the insertion cursor right and left in the command line.
- Pressing Shift right/left will delete the character on the right or the left of the cursor.
- Pressing UP and Down allows you to insert a previous expression or result in the command line.
- To clear the display, press the ON key twice in a row.

Drawing a parametric graph

To draw a parametric graph, enter a set of two expression depending upon the T variable separated by the & sign. Enter T using the  Keys
Enter & using the Menu.
Example: COS(T)*3&SIN(3*T)*3

Drawing more than one graph at once

To draw more than one graph at one:
- Enter the expression for the first graph
- Enter an '&' sign using the menu
- Enter the expression for the 2nd graph
- Press ENTER You can draw up to 5 graph simultaneously. You can not draw two different types of graphs simultaneously.
Example: SIN(5*θ)*3&3

Figure 3a

| The linear system solv r | The Graphical Environment |
|---|---|
| To solve a 2 or 3 unknown linear system,<br>• Run the 'Linear Solve' aplet through the Menu Key<br>• Select 2 or 3 unknown with the check box<br>• Enter the coefficients for the 6 or 12 fields (You can move the selection from on field to an other using the arrow keys)<br>The answer appears on the top of the screen. | When you are in the graphical environment,<br>• The Left and Right arrow allow you to move the cursor left and right on the equation. This updates the display of the dependent and independents variables on the last line.<br>• The Up and Down arrow allow you to select the previous or Next equation.<br>• Shifting a direction key allow you to move the graphical window.<br>• The Plus and Minus keys will perform a zoom in or out.<br>• The  key will toggle the table split view on and off.<br>• Any other key will bring you back into the normal environment. |
| Performing a calculation<br>To compute the value of an expression, enter it like you would write it on a paper.<br>Example: to compute SIN(COS($\pi^2$)) press the following keys<br>.<br>Then, Press the  key to validate the expression.<br>The calculator answers: -0.7849..<br>Working with fractions and proportions<br>To work with fraction, enter an expression that contains only divisions, additions, subtraction and multiplication of integers. The calculator answer will contain both the fractional form and the real form of the result.<br>Example: Enter 3+2/3+1+2/5.<br>The calculator answers: 79/15=5.0666.. | The simulator<br>On the PC emulator:<br>• You must click on the keys with the mouse<br>• You can move the calculator window by drag & drop of the calculator image<br>• In order to trace a graph in the graphical environment, you should use the arrow buttons of your PC keyboard (handle keyboard repetition)<br>• In the linear system solver, you have to move from field to field with the mouse. You have to enter the value with your PC keyboard.<br>Please note that the PC application is a simulator, a program designed to simulate the functionality of Prometheus, it is not an emulator designed to give an exact representation of the final product. |

Figure 3b

GRAPHICAL CALCULATOR

RELATED APPLICATIONS

This application is related to each of the following applications: "Graphical Calculator User Interface for Function Drawing" (HP Docket No.: 200310007-1); "Function Drawing in Polar Plan Using a Calculator" ((HP Docket No.: 200310008-1); "Input and Evaluation of Fractions Using a Calculator" (HP Docket No.: 200310009-1); and "Previous Calculation Reuse in a Calculator" (HP Docket No.: 200310016-1), each assigned to the present assignee, all of which are hereby incorporated by reference in their entirety, and all of which are being filed concurrently herewith.

FIELD OF THE INVENTION

The present invention relates to an improved graphical calculator and graphical calculator package.

BACKGROUND

A hand-held calculator is an important and useful device. Similar to a computer, the hand-held calculator has a processor, a memory, a display, and an input device; however, there are important distinguishing differences between the hand-held calculator and the computer.

The hand-held calculator is a specialized device and not a general purpose device, as is true of a computer. Because of this specialization, typically the hand-held calculator costs less, has a longer useful lifespan, and is more reliable and more portable than the computer.

Whereas a general purpose computer is capable of executing many different programs, a hand-held calculator typically executes a single program and less frequently supports execution of user-created programs. Normally, a hand-held calculator supports addition, subtraction, multiplication, and division of numbers, either integer-based or decimal-based, entered by a user and displays the results on a built-in display.

A graphical calculator is a further specialized version of a hand-held calculator having a display which is typically larger than a regular hand-held calculator display in order to enable graph output. In many instances, graphical calculator displays are liquid crystal displays for more accurate representation and enhanced readability of a graph output.

A graphical calculator is able to display a graph of a specific expression, e.g. a sine wave representing a sinusoidal function, entered by a user. Disadvantageously, graphical capabilities on hand-held calculators are only available as part of expensive and complex, "high end" scientific calculators. These graphical calculators are more expensive than other calculators, typically costing hundreds of dollars. These graphical calculators are more complicated to operate than other calculators because of the large amount of functionality incorporated therein.

The increased functionality has required a corresponding increase in the number of keys required for manipulating and using the calculator. For example, currently available graphical calculators have approximately fifty (50) keys including two (2) shift or modifier keys for a user to manipulate, e.g. a Texas Instruments (TI) 83 plus calculator has 51 keys and 2 shift keys that can be used concurrently, allowing up to 4 functions per key and a Hewlett-Packard (HP) 48G+/GX calculator has 49 keys and 3 shift keys allowing up to 6 functions per key.

Additionally, and in conjunction with the larger number of keys present, a user must contend with different modes of operation of the current graphical calculator. Different modes of operation, accessible via specific keys and/or key sequences, must be utilized in order to access specific calculator functionality, e.g. a graphical calculator may include a decimal mode, a binary mode, a hexadecimal mode, a finance mode, a statistics mode, and a graph mode.

Further, expression input requires increasingly complicated key manipulations and combinations. For example, in order to graph an expression, there are typically three combinations to be entered: a mode specifying combination, an expression entry combination, and a completion combination. The mode specifying combination may include manipulation of a graph key to instruct the calculator to graph the following expression entry. The expression entry combination may include manipulation of multiple keys to input the expression to be graphed and the completion combination includes manipulation of a key, e.g. an enter key, to instruct the calculator to perform the preceding operations, i.e. graph the entered expression.

Requiring a user to manipulate multiple keys increases the need for learning, the possibility of error and may lead to frustration on the part of the user. Also, requiring additional key presses by a user requires more time and slows the entry and use of the calculator by the user. The addition of multiple modes, complicated expression input combinations, and ever-increasing numbers of keys results in a very complicated device.

As further evidence of increasing complexity, the user manual for a currently available hand-held graphical calculator has dramatically increased in size in order to fully explain the use of the calculator. For example, the above-cited TI-83 plus calculator manual includes 269 pages and the HP 48G+/GX calculator manual includes 506 pages. These are very long documents which are typically not read by users. Further, users are likely to be deterred from reading the manual because of the imposing size of the manual.

Graphical calculators are very popular and effective educational aides. School students using graphical calculators can easily visualize complex functions; however, the complexity and cost of currently available graphical calculators deters many students and schools from making a purchase. Purchasers are dissuaded by the size of the manual, multiple modes of operation, and the number of keys and key combinations required for inputting expressions.

There is a need in the art for an improved graphical calculator and graphical calculator package.

SUMMARY

It is therefore an object of the present invention to provide an improved graphical calculator.

Another object of the present invention is to provide an improved graphical calculator package.

The present invention provides an improved graphical calculator and graphical calculator package.

A hand-held graphical calculator according to an embodiment of the present invention has a display and an input area. The input area includes a maximum of 30 keys and an input device.

An improved hand-held graphical calculator package according to an embodiment of the present invention includes a hand-held graphical calculator for graphically displaying a user-entered expression and a user manual. The user manual is a single sheet of instructions fully describing operation of the graphical calculator.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 3a and 3b are an example user manual according to an embodiment of the present invention describing operation of a graphical calculator.

DETAILED DESCRIPTION

Figure 1:
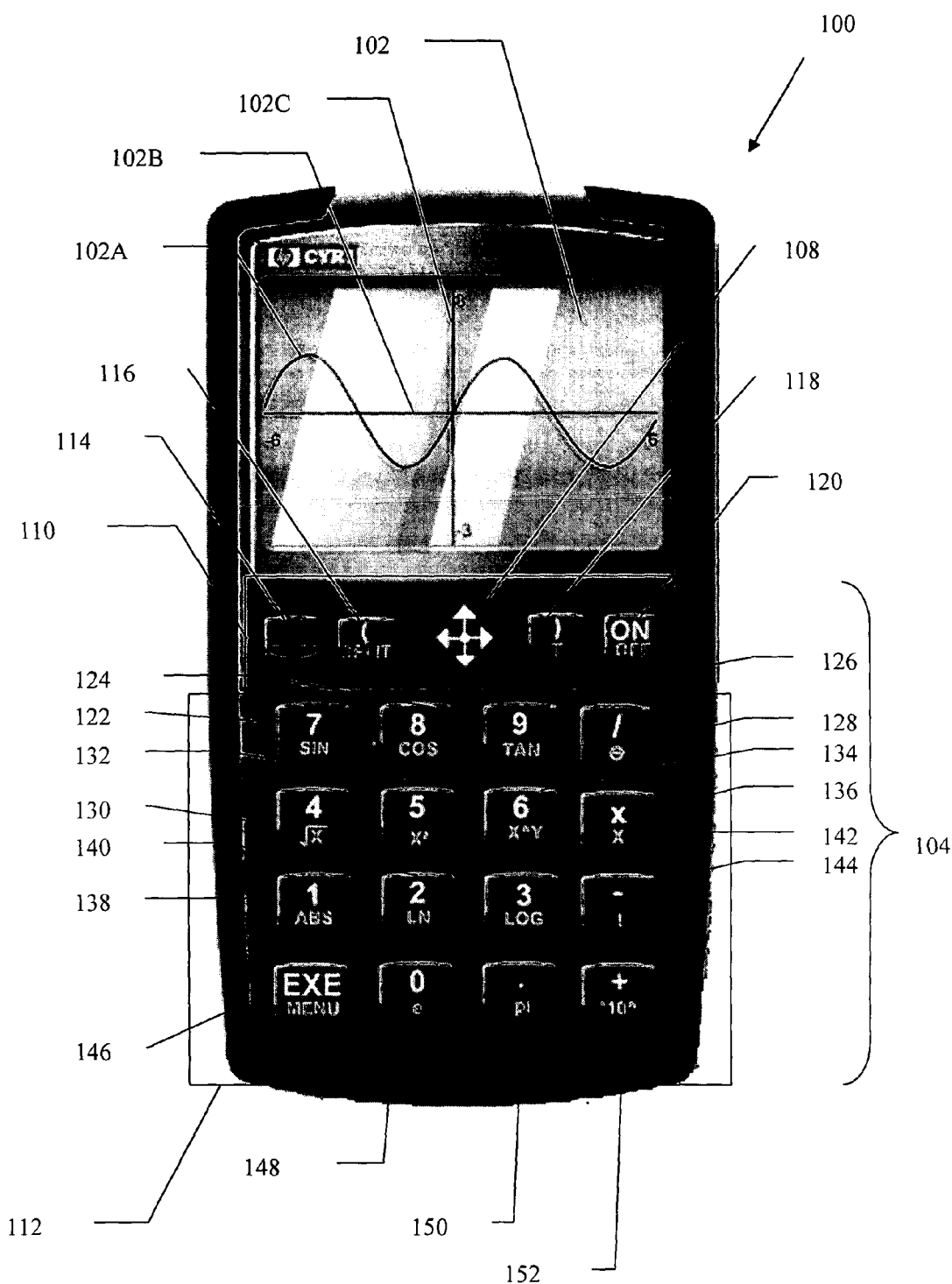
FIG. 1 is a front face view of a graphical calculator according to an embodiment of the present invention.

FIG. 1 is a front face view of a graphical calculator 100 according to an embodiment of the present invention.

Calculator 100 includes a display 102 and a primarily key-based input area 104 set in a front face 106. Although front face 106 is shown as a rounded rectangle, it is to be understood that the front face may be manufactured to be any of a number of different shapes. Further, although a specific number, type and configuration of input mechanisms are described below, it is to be understood that variations in the number, type, and configuration of input mechanisms may be found in different embodiments of the present invention.

Display 102 is a rectangular liquid crystal display (LCD) which is 96 pixels wide and 64 pixels in height. As shown in FIG. 1, display 102 displays a sine wave 102A on a graph having an X axis 102B and a Y axis 102C. Input area 104 includes four keys and one directional input device 108 in a row 110 and 16 keys arranged in a four by four grid 112.

Directional input device 108, as described in detail below, is used to navigate menus and perform information input, recall, and editing. Directional input device 108 may be manipulated by the user to input at least four directions, i.e. up, down, left, and right to calculator 100. The four keys in row 110 are shift key 114, open parenthesis key 116, close parenthesis key 118, and power key 120.

Shift key 114 is used to access a second set of functions, i.e. secondary functions, assigned to the remaining keys on calculator 100. For example, user activating power key 120 turns on calculator 100; however, activation of power key 120 subsequent to activation of shift key 114 turns off the calculator. In a similar fashion, each of the remaining keys of calculator 100 has an assigned secondary function.

Open parenthesis key 116 inputs a beginning parenthesis in a user-entered expression. The secondary function of open parenthesis key 116 is to input a command causing calculator 100 to split a graphical output on display 102 such that one half of the display is a graph and the other half is numerical information related to the graph displayed.

Close parenthesis key 118 inputs an ending parenthesis in a user-entered expression. The secondary function of close parenthesis key 118 is to input a T variable in a user-entered expression.

Power key 120 turns on calculator 100 and, as described above, the secondary function of power key 120 is to turn off calculator 100. Additionally, power key 120 operates as a clear key after calculator 100 is turned on, i.e. the power key may be used to clear the displayed expression on display 102. Manipulation of shift key 114 followed by right arrow of directional input device 108 deletes input characters to the right of the current input position and manipulation of shift key 114 followed by left arrow of directional input device 108 deletes input characters to the left of the current input position.

Beginning in the upper left corner of four by four grid 112, the description of the remaining keys is now provided in a row, column order.

Row 1, column 1 key 122, i.e. the seven key, inputs a seven (7) value in a user-entered expression and has a secondary function of inputting a sin function in a user-entered expression. Row 1, column 2 key 124, i.e. the eight key, inputs an eight (8) value in a user-entered expression and has a secondary function of inputting a cos function in a user-entered expression. Row 1, column 3 key 126, i.e. the nine key, inputs a nine (9) value in a user-entered expression and has a secondary function of inputting a tan function in a user-entered expression. Row 1, column 4 key 128, i.e. the division key, inputs a division (/) function in a user-entered expression and has a secondary function of inputting a theta (θ) variable in a user-entered expression.

Row 2, column 1 key 130, i.e. the four key, inputs a four (4) value in a user-entered expression and has a secondary function of inputting a square root function in a user-entered expression. Row 2, column 2 key 132, i.e. the five key, inputs a five-(5) value in a user entered expression and has a secondary function of inputting a squared function, i.e. raising a value to the second power, in a user-entered expression. Row 2, column 3 key 134, i.e. the six key, inputs a six (6) value in a user-entered expression and has a secondary function of inputting a value raised to the power of a subsequently entered value function, i.e. X raised to the power of Y, in a user-entered expression. Row 2, column 4 key 136, i.e. the multiplication key, inputs a multiplication (*) function in a user-entered expression and has a secondary function of inputting an X variable in a user-entered expression.

Row 3, column 1 key 138, i.e. the one key, inputs a one (1) value in a user-entered expression and has a secondary function of inputting an absolute value function in a user-entered expression. Row 3, column 2 key 140, i.e. the 2 key, inputs a two (2) value in a user-entered expression and has a secondary function of inputting a natural logarithm function in a user-entered expression. Row 3, column 3 key 142, i.e. the three key, inputs a three (3) value in a user-entered expression and has a secondary function of in putting eight logarithm function in a user-entered expression. Row 3, column 4 key 144, i.e. the minus key, inputs a subtraction (−) function in a user-entered expression and has a secondary function of inputting a NOT function in a user-entered expression.

Row 4, column 1 key 146, i.e. the execute key, inputs an execute command to calculator 100 and has a secondary function of inputting a menu command to the calculator. Row 4, column 2 key 148, i.e. the zero key, inputs a zero (0) value in a user-entered expression and has a secondary function of inputting an e value in a user-entered expression. Row 4, column 3 key 150, i.e. the dot key, inputs a decimal point in a value entry and has a secondary function of in putting a pi constant value in a user-entered expression. Row 4, column 4 key 152, of i.e. the plus key, inputs an addition (+) function in a user-entered expression and has a secondary function of in putting a times ten to the power of a subsequently entered value, i.e. "*10^Y", in a user-entered expression.

Figure 2:
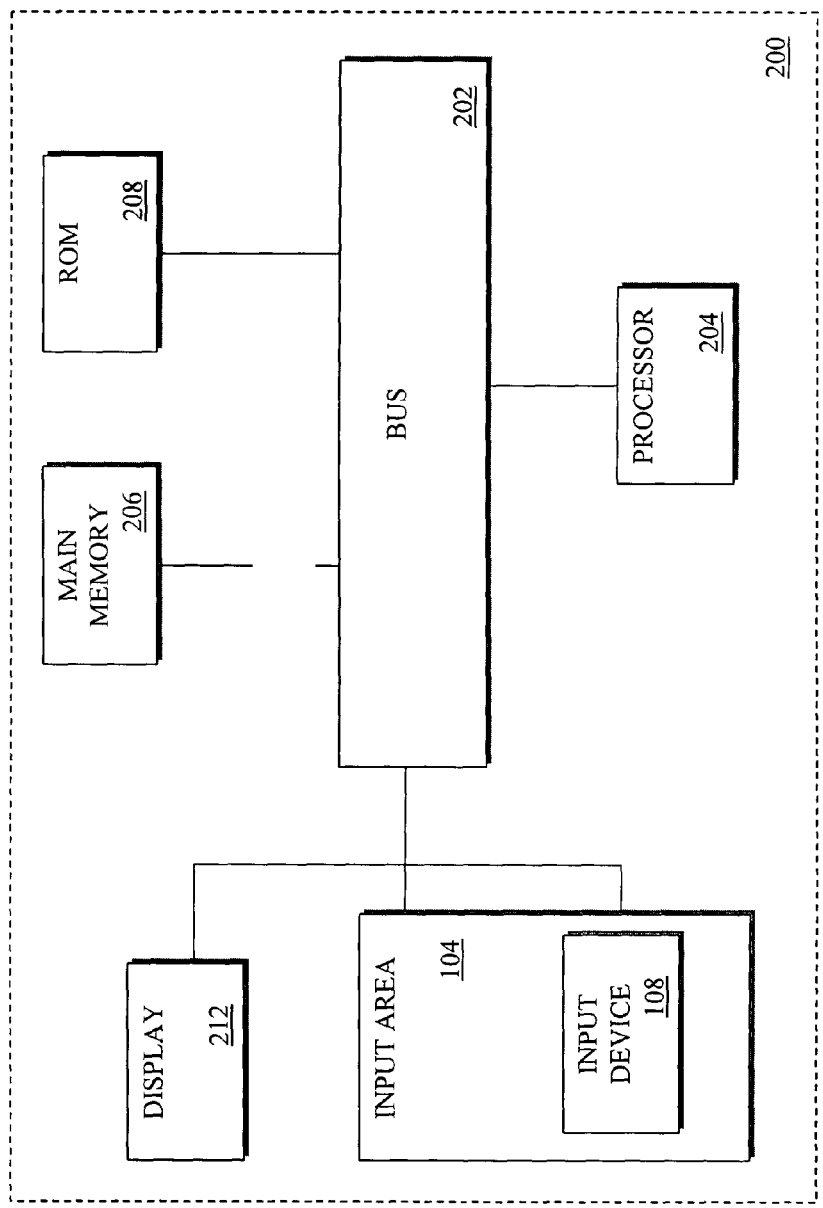
FIG. 2 is a high level block diagram of a graphical calculator according to an embodiment of the present invention.

FIG. 2 is a block diagram illustrating an exemplary calculator 100 upon which an embodiment of the invention may be implemented.

Calculator 100 includes a bus 202 or other communication mechanism for communicating information, and a processor 204 coupled with the bus 202 for processing information. In one particular embodiment, processor 204 is a 16 bit processor. Calculator 100 also includes a main memory 206, such as a random access memory (RAM) or other dynamic storage device, coupled to the bus 202 for storing data and expressions according to an embodiment of the present invention and instructions to be executed by processor 204. Main memory 206 also may be used for storing temporary variables or other intermediate information during execution of instructions to be executed by processor 204. In one particular embodiment, main memory 206 is an 8 Kilobyte RAM. Further, it is to be understood that in alternate embodiments, the components of calculator 100 may be combined onto a single integrated circuit, e.g. processor 204 and main memory 206 may be combined on a single "system on a chip."

Calculator 100 further includes a read only memory (ROM) 208 or other static storage device coupled to the bus 202 for storing static information and instructions for the processor 204. In one particular embodiment, ROM 208 is a 128 Kilobyte ROM.

Calculator 100 may be coupled via the bus 202 to a display 212, such as the above-described 96*64 pixel LCD, for displaying an interface to a user. An input area 104, as described above with reference to FIG. 1, is coupled to the bus 202 for communicating information, e.g. user-entered expressions and values, and command inputs to the processor 204. An input device 108, as described above with respect to FIG. 1, is part of input area 104 and communicates direction information and command selections to processor 204 and controls cursor movement on the display 212. This input device typically has two degrees of freedom in two axes, a first axis (e.g., x) and a second axis (e.g., y) allowing the device to specify positions in a plane.

The invention is related to the use of calculator 100, such as the depicted calculator of FIG. 2, to input and apply operations, e.g. expressions, to data and graph the results of operations by driving display 212. According to one embodiment of the invention, data is stored and accessed from main memory 206 by calculator 200 in response to processor 204 executing sequences of instructions contained in main memory 206 in response to input received via input device 214, cursor control 216. A user interacts with the calculator 100 via a user interface displayed (as described below) on display 212.

Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

In addition to the above-described hand-held graphical calculator, a package combining the calculator and a user manual, e.g. user manual 300 illustrated in FIGS. 3a and 3b, for sale together is contemplated. A small user manual has a number of benefits over existing user manuals for graphical calculators currently known to the inventor: reduced space requirements (both on store shelves and display areas and in user storage and retrieval areas), reduced shipping costs, and reduced printing costs.

The user manual 300 is two pages in length using an easily readable font size, e.g. 12 point. User manual 300 may be reduced in size to a single page by printing each page of the manual on a different side of the same sheet, i.e. FIG. 3a on one side and FIG. 3b on the opposite side.

Advantageously, reducing the size of the manual enables a reduction in the amount of shelf space required for displaying the packaged calculator and user manual in a store. Further, because the weight of the package has been reduced in comparison to known graphical calculator packages including calculators and manuals, the shipping and printing costs are reduced, as well.

The two sides of the manual 300 provide instructions describing user operation of calculator 100. Each of the capabilities of the calculator 100 are described in manual 300. It is to be understood that even though each page of manual 300 is depicted as having four sections in a two by two grid, alternative configurations and numbers of section and grid sizes are contemplated by the inventor.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A hand-held calculator comprising:
    a calculator having a display, wherein the display is adapted to display graphs; and
    an input area connected to the calculator wherein the input area comprises a plurality of keys and a directional input device, wherein each key of the plurality of keys is arranged to generate a maximum of two functions.

2. The calculator as claimed in claim 1, wherein the directional input device is adapted to input one of at least four directions responsive to a single activation of solely the directional input device.

3. The calculator as claimed in claim 1, the input area of the calculator further comprising:
    a row of input keys and the directional input device; and
    a grid of input keys.

4. The calculator as claimed in claim 3, wherein the grid is a four by four grid.

5. The calculator as claimed in claim 1, wherein the display is 96 pixels by 64 pixels.

6. The calculator as claimed in claim 1, wherein the calculator comprises a maximum of 30 keys.

7. A hand-held graphical calculator package, the package comprising:
    a hand-held graphical calculator for displaying a graph of an expression; and
    a user manual comprising a single sheet of instructions including operating instructions for the graphical calculator.

8. The package as claimed in claim 7, wherein the user manual is printed on both sides of the single sheet.

9. The package as claimed in claim 7, wherein the user manual is printed using a 12 point font size.

10. The package as claimed in claim 7, wherein the user manual is printed using a minimum of a 12 point font size.

11. The package as claimed in claim 7, wherein the calculator comprises:

a calculator having a display, wherein the display is adapted to display graphs; and an input area connected to the calculator wherein the input area comprises a plurality of keys and a directional input device.

12. The package as claimed in claim 11, wherein the directional input device is adapted to input at least four directions.

13. The package as claimed in claim 11, the input area of the calculator further comprising:

a row of input keys and the directional input device; and a grid of input keys.

14. The package as claimed in claim 13, wherein the grid of input keys is a four by four grid.

15. The package as claimed in claim 11, wherein the display is 96 pixels by 64 pixels.

16. The package as claimed in claim 7, wherein the calculator comprises a maximum of 30 keys.

17. The package as claimed in claim 7, wherein the calculator compromises a plurality of keys and a directional input device, wherein each key of the plurality of keys is arranged to generate a maximum of two functions.

* * * * *

UNITED STATES PATENT AND TRADEMARK OFFICE
CERTIFICATE OF CORRECTION

PATENT NO. : 7,403,189 B2
APPLICATION NO. : 10/636780
DATED : July 22, 2008
INVENTOR(S) : Cyrille de Brébisson It is certified that error appears in the above-identified patent and that said Letters Patent is hereby corrected as shown below:

In column 8, line 8, in Claim 17, delete "compromises" and insert -- comprises --, therefor.

Signed and Sealed this

Twenty-third Day of December, 2008

JON W. DUDAS
*Director of the United States Patent and Trademark Office*